US012469660B2

(12) United States Patent
Malich et al.

(10) Patent No.: US 12,469,660 B2
(45) Date of Patent: Nov. 11, 2025

(54) MOUNTING ADAPTER FOR AT LEAST ONE ELECTRICAL SWITCH AND SWITCH CABINET WITH A MOUNTING ADAPTER OF THIS TYPE

(71) Applicant: Siemens Aktiengesellschaft, Munich (DE)

(72) Inventors: Timo Malich, Kümmersbruck (DE); Ekkehard Plechinger, Röckersbühl (DE); Christoph Weber, Ergoldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 339 days.

(21) Appl. No.: 18/012,691

(22) PCT Filed: May 27, 2021

(86) PCT No.: PCT/EP2021/064133

§ 371 (c)(1),
(2) Date: Dec. 23, 2022

(87) PCT Pub. No.: WO2021/259584

PCT Pub. Date: Dec. 30, 2021

(65) Prior Publication Data

US 2023/0187156 A1 Jun. 15, 2023

(30) Foreign Application Priority Data

Jun. 23, 2020 (DE) ..................... 10 2020 207 771.1

(51) Int. Cl.
*H01H 71/00* (2006.01)
*H01H 71/02* (2006.01)

(52) U.S. Cl.
CPC . *H01H 71/0264* (2013.01); *H01H 2071/0285* (2013.01)

(58) Field of Classification Search
CPC .. H01H 9/342; H01H 71/0264; H01H 71/025; H01H 33/53; H01H 9/047;
(Continued)

(56) References Cited

U.S. PATENT DOCUMENTS 4,181,836 A 1/1980 Miracle
4,825,336 A 4/1989 Lio et al.
(Continued)

FOREIGN PATENT DOCUMENTS

CA 2473272 A1 1/2005
CN 204270998 U * 4/2015
(Continued)

*Primary Examiner* — Mandeep S Buttar
(74) *Attorney, Agent, or Firm* — Laurence A. Greenberg; Werner H. Stemer; Ralph E. Locher

(57) ABSTRACT

A mounting adapter is provided for at least one electrical switch having outlets for switching gases on an output side and/or an input side thereof. The at least one electrical switch can be mounted from the upper side of the mounting adapter and the mounting adapter can be securely mounted in a switch cabinet. The switching gases of an electrical switch mounted in the mounting adapter are guided from the output side and/or the input side in exhaust gas channels to a respective side/underside of the mounting adapter and can exit the mounting adapter from there. A switch cabinet includes the mounting adapter.

12 Claims, 8 Drawing Sheets

(58) Field of Classification Search

CPC ...... H01H 85/43; H01H 85/38; H02B 13/025; H02B 1/056; H02B 1/56

USPC ........................................................ 361/673

See application file for complete search history.

(56) References Cited

U.S. PATENT DOCUMENTS

| | | | | |
|---|---|---|---|---|
| 5,241,289 | A * | 8/1993 | Markowski | H01H 9/342 335/201 |
| 6,407,354 | B1 * | 6/2002 | Turner | H01H 9/342 218/155 |
| 6,762,389 | B1 * | 7/2004 | Crooks | H01H 9/342 218/35 |
| 8,735,759 | B2 * | 5/2014 | Potratz | H01H 9/342 218/35 |
| 9,608,415 | B2 * | 3/2017 | Cardin | H02B 13/025 |
| 2005/0012578 | A1 * | 1/2005 | Afshari | H02B 1/06 335/202 |
| 2010/0133236 | A1 * | 6/2010 | Majewski | H01H 9/342 218/157 |
| 2012/0120558 | A1 * | 5/2012 | Raabe | H01H 71/025 361/619 |
| 2014/0251959 | A1 * | 9/2014 | Fasano | H01H 9/30 218/155 |
| 2015/0129553 | A1 | 5/2015 | Jang | |
| 2023/0187155 | A1 * | 6/2023 | Malich | H01H 71/025 200/237 |

FOREIGN PATENT DOCUMENTS

| | | | | |
|---|---|---|---|---|
| EP | 1498921 | A1 * | 1/2005 | H01H 9/342 |
| FR | 2704352 | A1 | 10/1994 | |

* cited by examiner

MOUNTING ADAPTER FOR AT LEAST ONE ELECTRICAL SWITCH AND SWITCH CABINET WITH A MOUNTING ADAPTER OF THIS TYPE

FIELD AND BACKGROUND OF THE INVENTION

The invention relates to a mounting adapter for at least one electrical switch and to a switch cabinet having such a mounting adapter.

During the short-circuit turning-off of circuit breakers, switching gases are produced which carry impurities with them. These impurities may be, for example, metal beads or soot particles. In the event of a short-circuit, these impurities are distributed throughout the installation.

Affected switch cabinets and distributors have to be cleaned frequently in a complicated way, which may lead to installation downtimes. Similarly, electronic devices or lines in said distributors may be adversely affected by the metal beads, giving rise, for example, to short-circuits.

Older circuit breakers frequently blow said impurities unhindered out of the switch and distribute same throughout the installation. Modern circuit breakers may be equipped with small filters. The cleaning effect of said filters is highly limited because of the small construction volume within a circuit breaker. Frequently, only approx. 50% of the particles are retained, and the remainder is distributed in the installation.

In order to avoid electrical flashovers, typically insulation distances in conventional distributor constructions are realized by relatively large phase partitions and/or clamping coverings. In the restricted construction space of switch panels, these measures are not possible, or can be realized only with difficulty, because of space reasons.

SUMMARY OF THE INVENTION

It is therefore the object of the present invention to provide a mounting adapter which, even in a restricted switch panel, permits the required insulation distances for protecting against flashovers and a targeted dissipation of the switching gases.

The object according to the invention is achieved by the mounting adapter as described below. Advantageous refinements of the mounting adapter according to the invention are indicated in dependent claims. The object according to the invention is also achieved by the switch cabinet as described below.

The mounting adapter for at least one electrical switch is configured in such a manner that the at least one electrical switch has outlets for switching gases on its output side and/or on its input side, wherein the at least one electrical switch can be mounted from the top side of the mounting adapter, wherein the mounting adapter can be securely mounted in a switch cabinet, wherein the switching gases of an electrical switch mounted in the mounting adapter are guided from the output side and/or the input side in exhaust gas channels in each case to the side/underside of the mounting adapter and can exit the mounting adapter from there.

An advantage of the mounting adapter according to the invention is that, in the event of a short-circuit of the electrical switch, the exhaust gas flow can be guided and controlled in a defined way. Furthermore, the mounting adapter according to the invention permits a compact design which can readily be integrated in a switch panel or a switch cabinet.

In one refinement of the mounting adapter according to the invention, the switching gases from the output side and/or from the input side of the at least one electrical switch are first of all guided in first exhaust gas channel sections substantially perpendicularly in the direction of the side/underside of the mounting adapter and are then fed to one another in second exhaust gas channel sections below the at least one electrical switch.

In a further refinement of the mounting adapter according to the invention, electrically insulated fittings past which the switching gases are conducted run through one of the first exhaust gas channel sections.

In one refinement, in the case of a multi-pole electrical switch, the switching gases are guided separately downstream of the respective poles as far as the side/underside of the mounting adapter. In the case of a multi-pole electrical switch, the switching gases can be guided at least partially separately downstream of the respective poles in the second exhaust gas channel sections.

In a further refinement of the mounting adapter according to the invention, the latter, on the side/underside, comprises a filter box through which the switching gases exit the mounting adapter. 17 In a further refinement, the filter box is arranged at the convergence of the second exhaust gas channel sections.

In a further refinement of the mounting adapter according to the invention, the filter box has an arrangement of holes, the filter box is filled with a filter medium, or the filter box comprises a labyrinth.

In one refinement, the electrical switch is introduced into the mounting adapter from the top side and/or fastening and contact screws are likewise accessible from the top side.

In a further refinement, the electrical switch is a circuit breaker.

The switch cabinet having a mounting adapter according to the invention comprises a wall at which the mounting adapter is securely mounted in the switch cabinet.

The above-described properties, features and advantages of this invention and the manner in which they are achieved will become clearer and more comprehensible in conjunction with the description below of the exemplary embodiments which will be explained in more detail in conjunction with the figures.

DETAILED DESCRIPTION OF THE INVENTION

Figure 1:
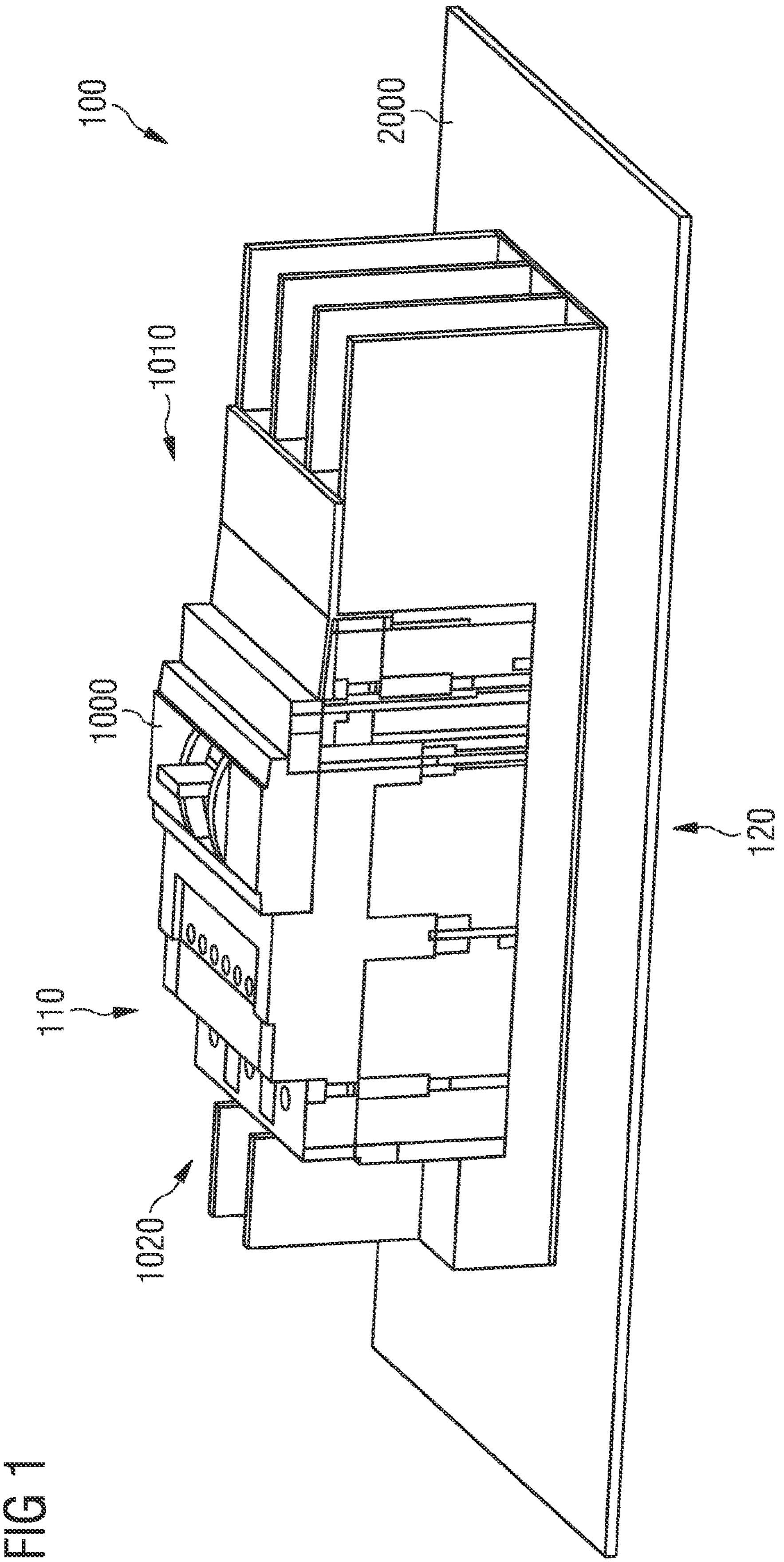
FIG. 1: shows a mounting adapter according to the invention with a mounted electrical switch.

FIG. 1 illustrates a mounting adapter 100 according to the invention for at least one electrical switch 1000. Said at least one electrical switch 1000 is mounted in the mounting adapter 100. The electrical switch 1000 has outlets for switching gases on its output side 1010 and/or on its input side 1020. The electrical switch 1000 can be mounted from the top side 110 of the mounting adapter 100, wherein the mounting adapter 100 itself can be securely mounted in a switch cabinet.

The switching gases of an electrical switch 1000 mounted in the mounting adapter 100 are guided from the output side 1010 and/or the input side 1020 in exhaust gas channels in each case to the side/underside 120 of the mounting adapter 100 and can exit the mounting adapter 100 from there.

Figure 2:
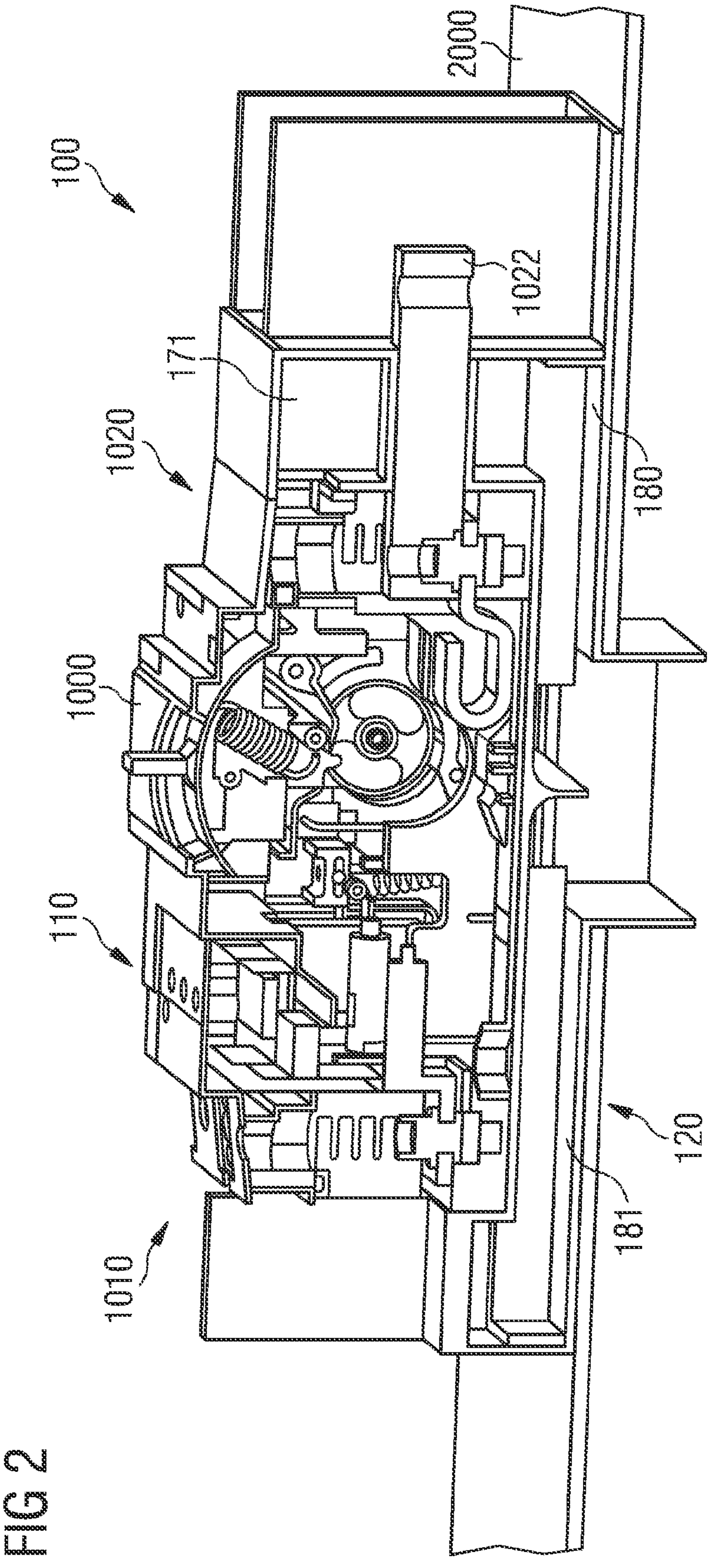
FIG. 2: shows a mounting adapter according to the invention with a mounted electrical switch and exhaust gas channels.

These exhaust gas channels are described in more detail in FIG. 2. At the input side 1020 of the electrical switch 1000, the switching gases are first of all guided in a first exhaust gas channel section 171 substantially perpendicularly in the direction of the side/underside 120 of the mounting adapter 100 and then in a second exhaust gas channel section 180 below the at least one electrical switch 1000 in order to exit the mounting adapter 100.

The same applies to the output side 1010 of the electrical switch 1000. Here too, the switching gases are guided in first exhaust gas channel sections substantially perpendicularly in the direction of the side/underside 120 of the mounting adapter 100 and then in a second exhaust gas channel section 181 below the at least one electrical switch 1000 in order to exit the mounting adapter 100.

The switching gases from the input side 1020 and/or from the output side 1010 are fed to one another below the at least one electrical switch 1000 in order to exit the mounting adapter 100.

Electrically insulated fittings 1021, 1022, 1023 past which the switching gases are conducted can run through the first exhaust gas channel sections 170, 171, 172. For example, FIG. 2 illustrates a busbar 1022 for supplying the input side 1020, the busbar running through the first exhaust gas channel section 171.

Figure 3:
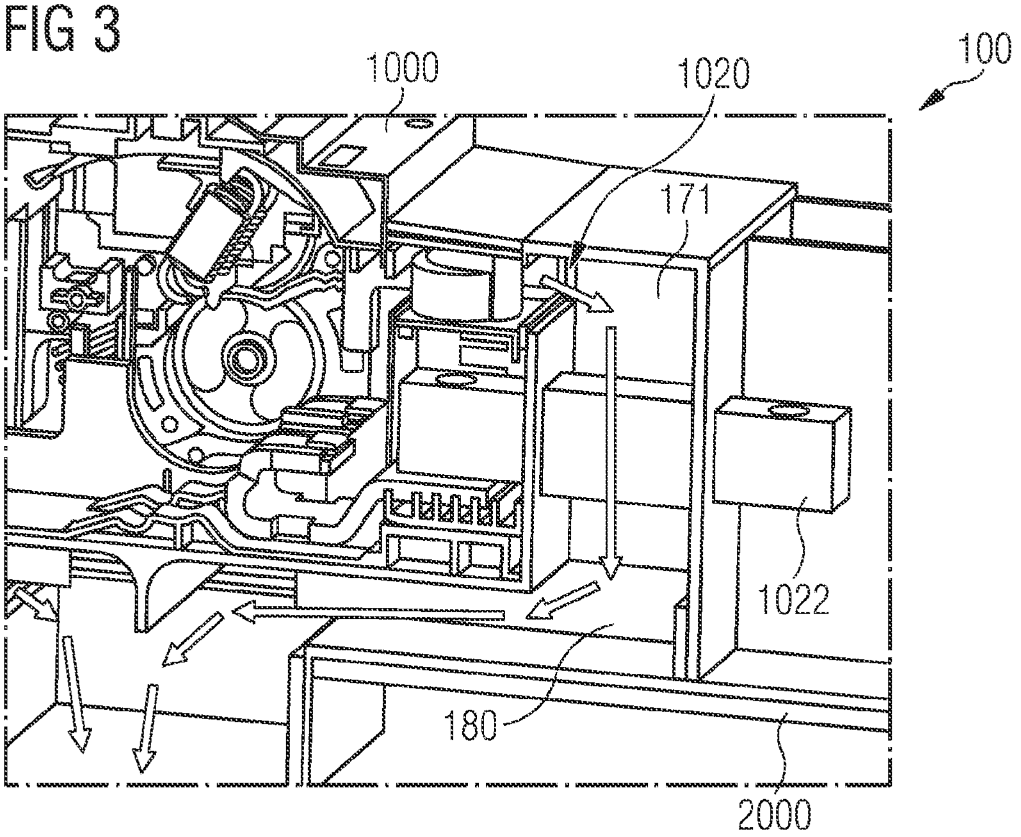
FIG. 3: shows a mounting adapter according to the invention with a first exhaust gas channel section and second exhaust gas channel section.

In FIG. 3, the flow of the switching gases is illustrated by arrows from the input side 1020 through the first exhaust gas channel section 171 past electrical fittings 1022 into the second exhaust gas channel section 180. From there, the switching gases can exit the mounting adapter 100.

Figure 4:
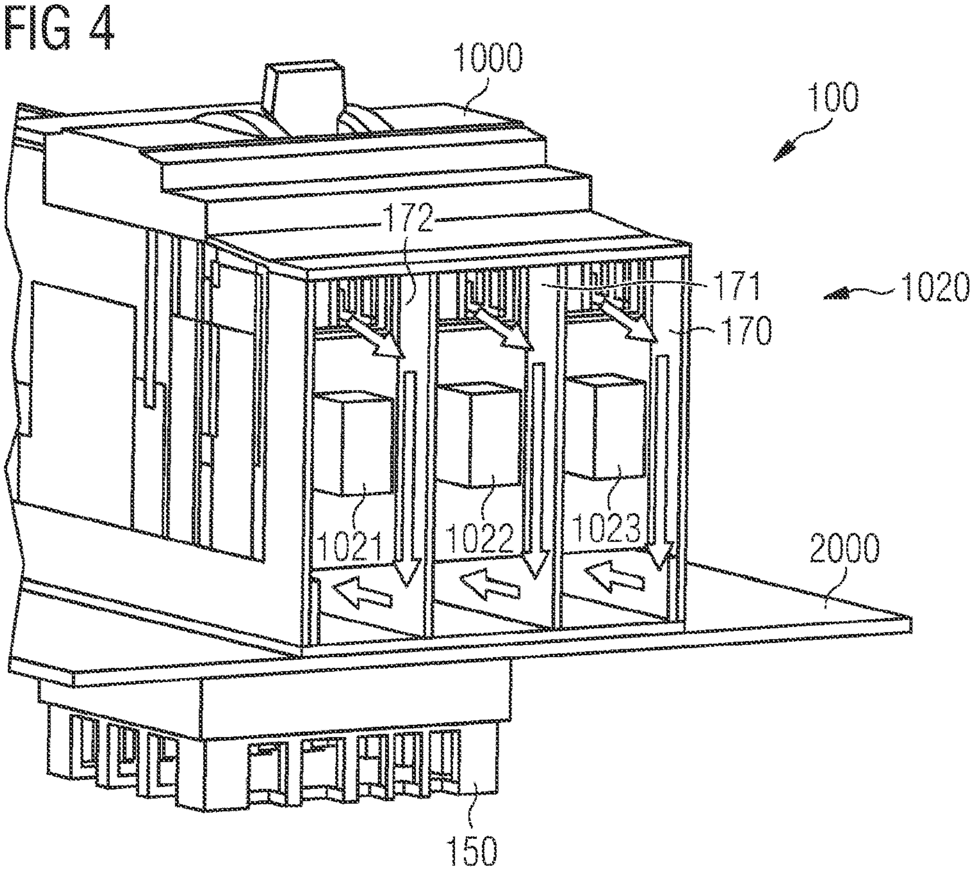
FIG. 4: shows a mounting adapter according to the invention with switching gas flows separated downstream of poles.

In FIG. 4, the mounting adapter 100 according to the invention is illustrated for a multi-pole electrical switch 1000. The switching gases are guided separately downstream of the respective poles in first exhaust gas channel sections 170, 171, 172.

Figure 5:
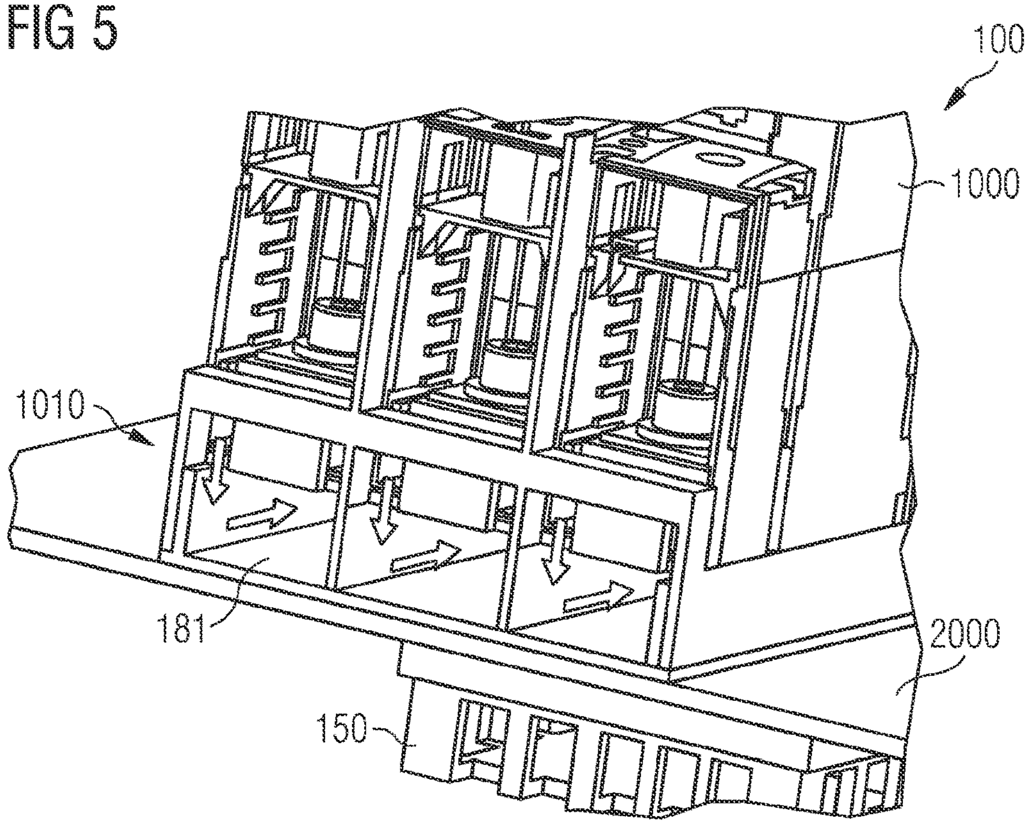
FIG. 5: shows a deflection of the exhaust gas flows at the mounting adapter according to the invention.

FIG. 5 shows the output side 1010 of the electrical switch 1000 and the first exhaust gas channel section and the diversion into the second exhaust gas channel section 181.

Figure 6A:
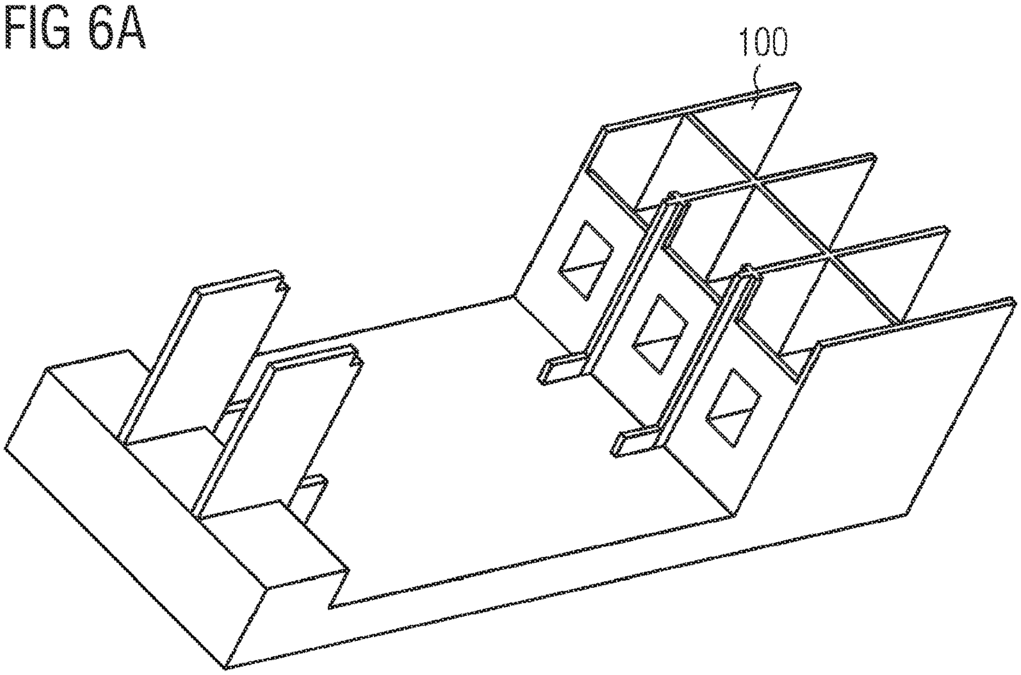
FIGS. 6A, 6B, and 6C: show a mounting adapter according to the invention with exhaust gas channels from various perspectives.
Figure 6B:
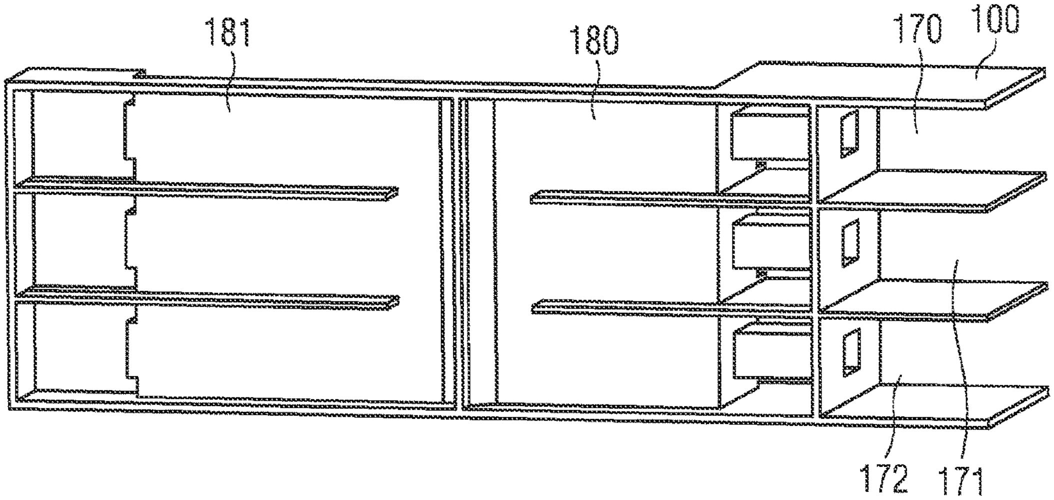
Figure 6C:
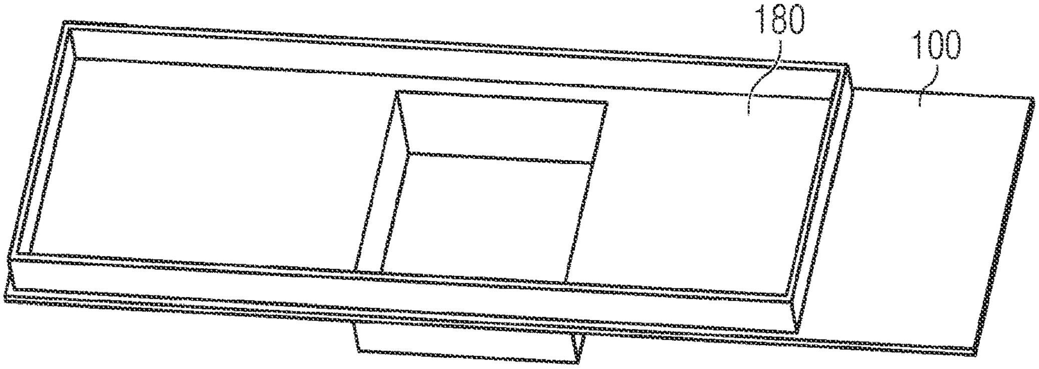

FIGS. 6A, 6B, and 6C show the mounting adapter 100 according to the invention with its first exhaust gas channel sections 170, 171, 172 and its second exhaust gas channel sections 180, 181. It is illustrated in FIG. 6B that, in the case of a multi-pole electrical switch 1000, the switching gases are guided at least partially separately downstream of the respective poles in the second exhaust gas channel sections 180, 181.

The outer housing covering of the first exhaust gas channel sections 170, 171, 172 and of the second exhaust gas channel sections 180, 181 covering said channels such that they 11 withstand the turning-off pressure, is not illustrated in FIGS. 6A, 6B and 6C.

Figure 7:
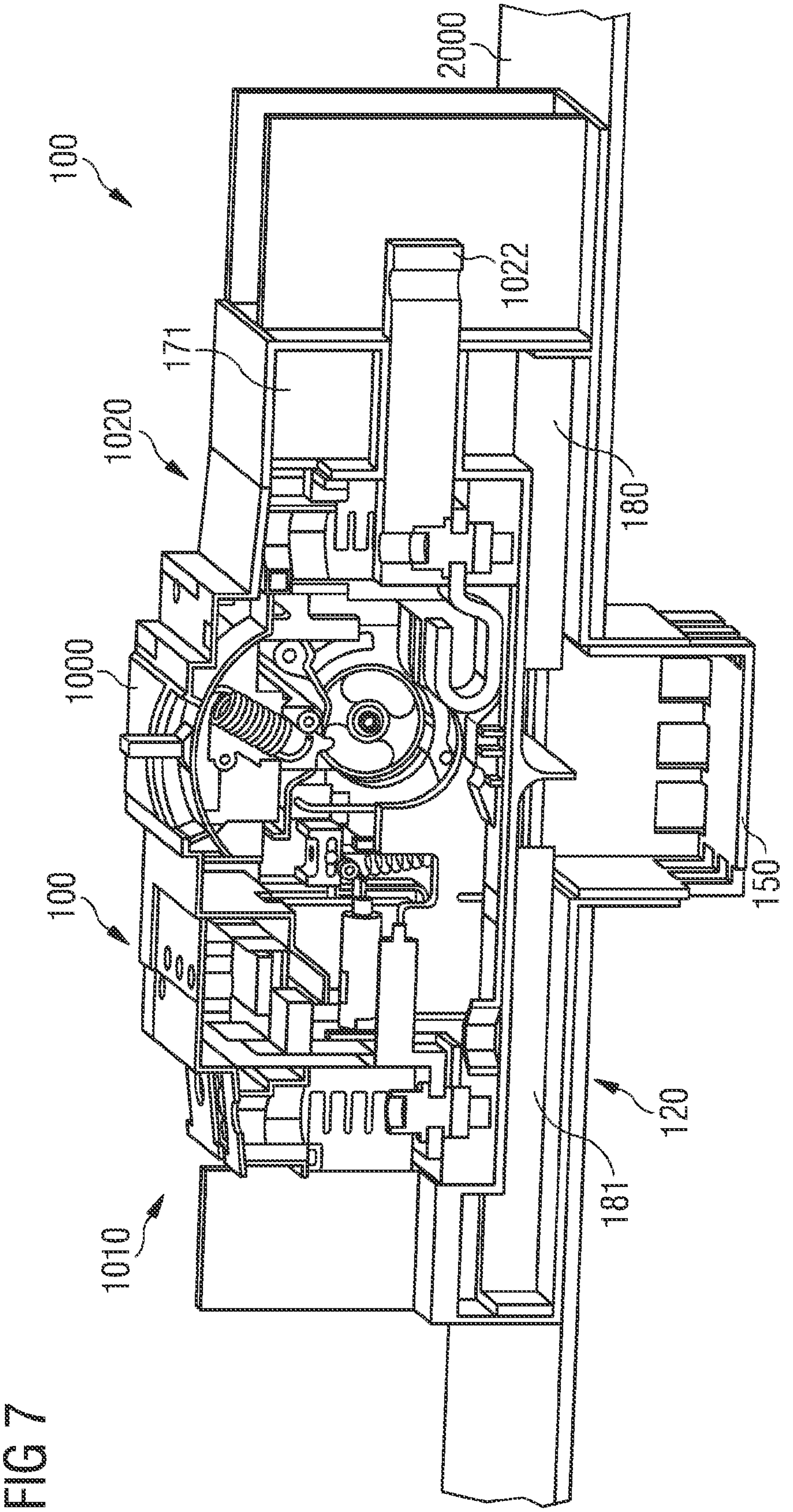
FIG. 7: shows a mounting adapter according to the invention with a filter box.

FIG. 7 illustrates the mounting adapter 100 according to the invention, wherein the latter, on its side/underside 120, has a filter box 150 through which the switching gases exit the mounting adapter 100. The filter box 150 is arranged at the convergence of the second exhaust gas channel sections 180, 181. Said filter box is likewise illustrated in FIGS. 4 and 5.

Figure 8:
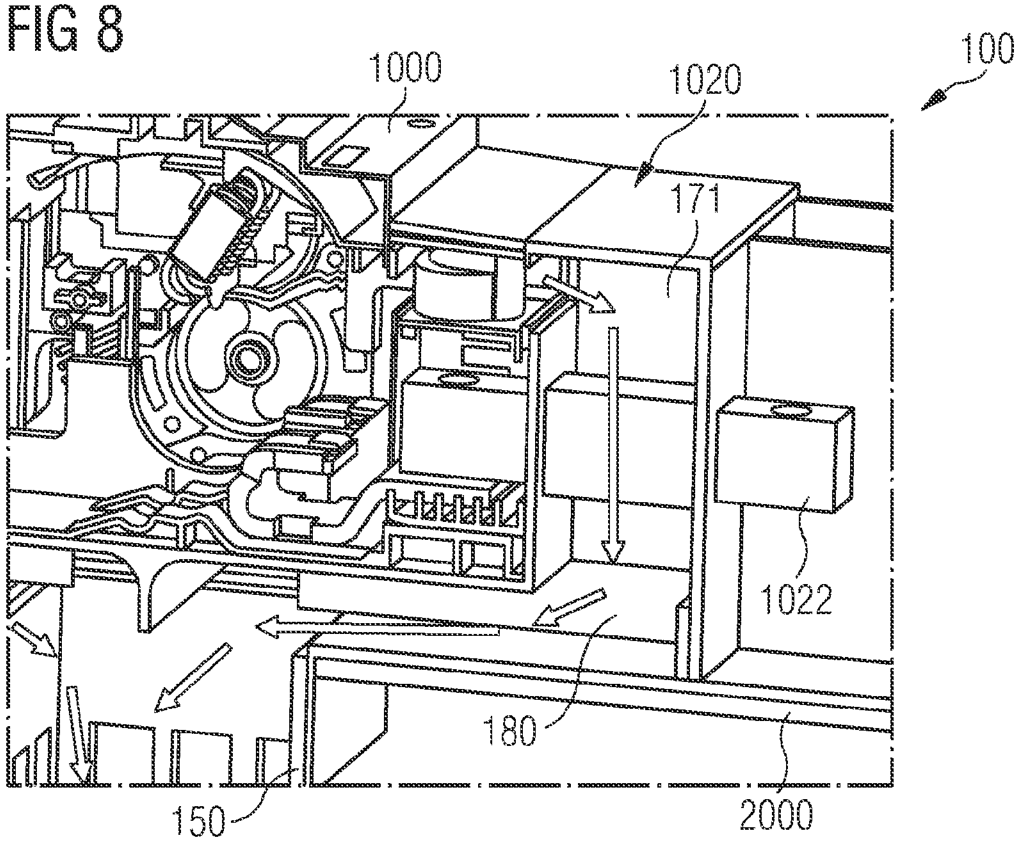
FIG. 8: shows a mounting adapter according to the invention with a pictorial representation of the exhaust gas flow as far as the filter box.
Figure 9:
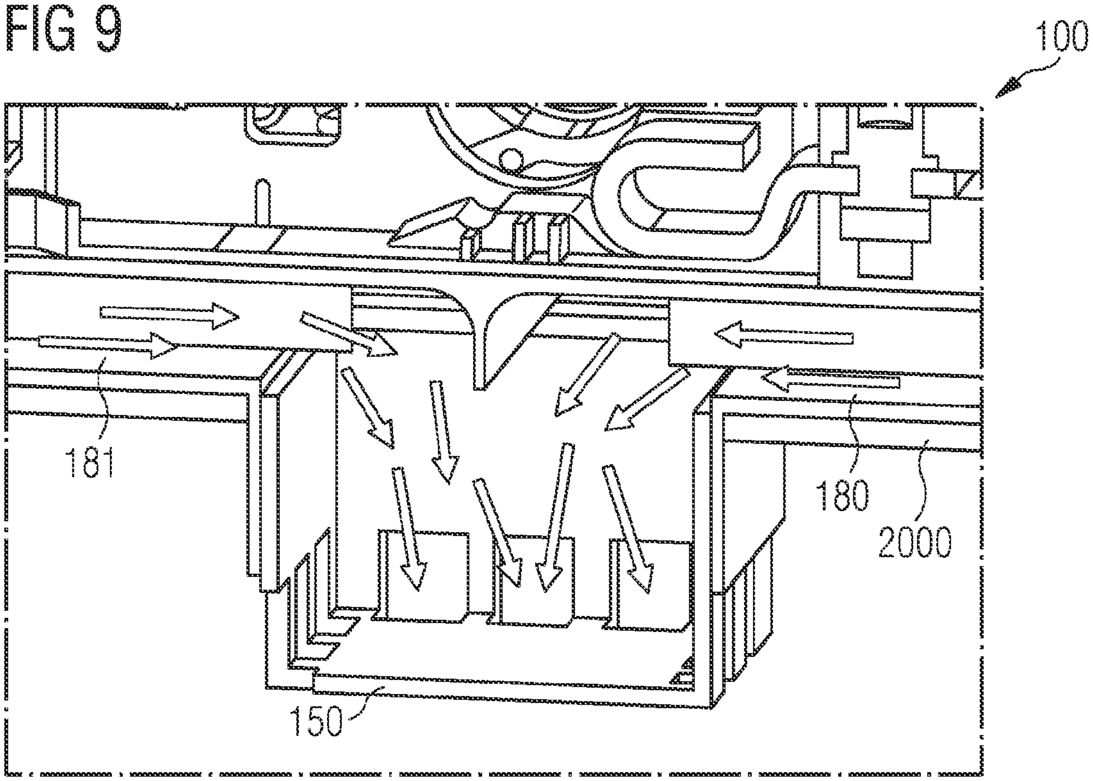
FIG. 9: shows a mounting adapter according to the invention with a filter box and arrangement of holes.

FIG. 8, again with arrows, shows the flow of the switching gases from the input side 120 through the first exhaust gas channel section 171 and the second exhaust gas channel section 180 into the filter box 150. According to FIG. 9, the filter box 150 can have an arrangement of holes through which the dirt particles or combustion particles remain and are retained in the filter box 150. In such an embodiment, the filter box 150 is not filled with a filter medium.

Figure 10:
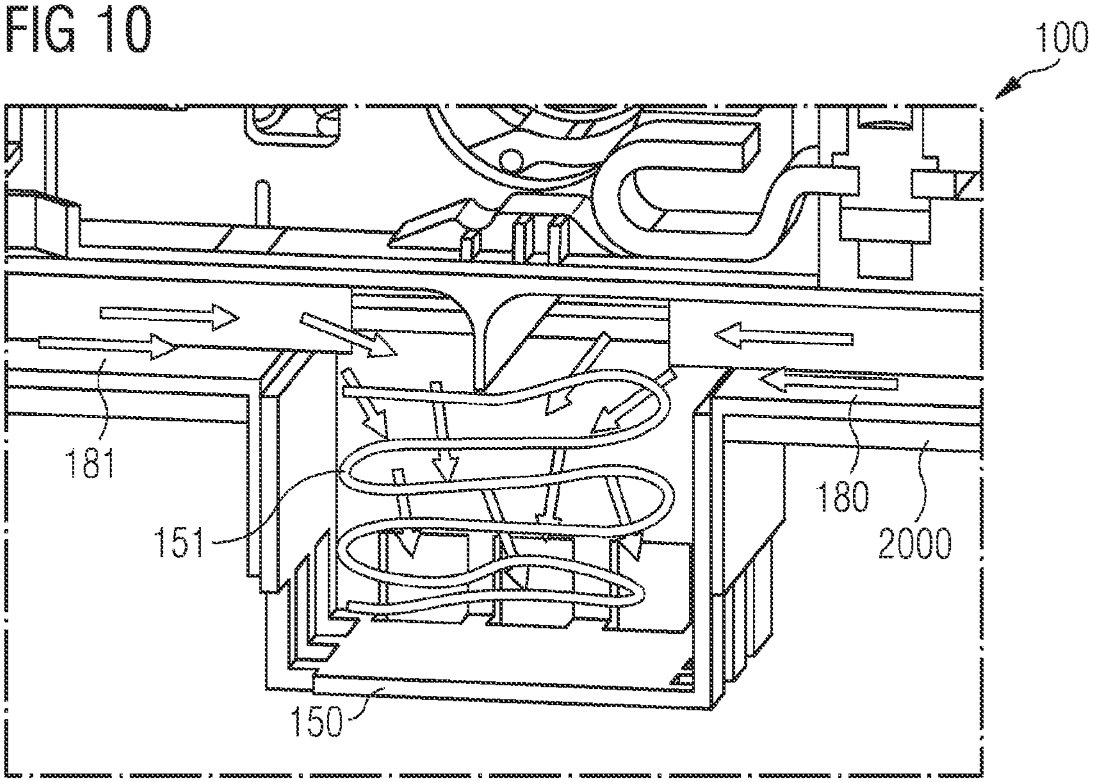
FIG. 10: shows a mounting adapter according to the invention with a filter box and filter medium.

In FIG. 10, the filter box 150 is filled with a filter medium, for example a wad of rockwool or glass wool. Dirt particles or soot particles can be deposited on said filter medium 151, and therefore they cannot exit the mounting adapter 100.

Figure 11:
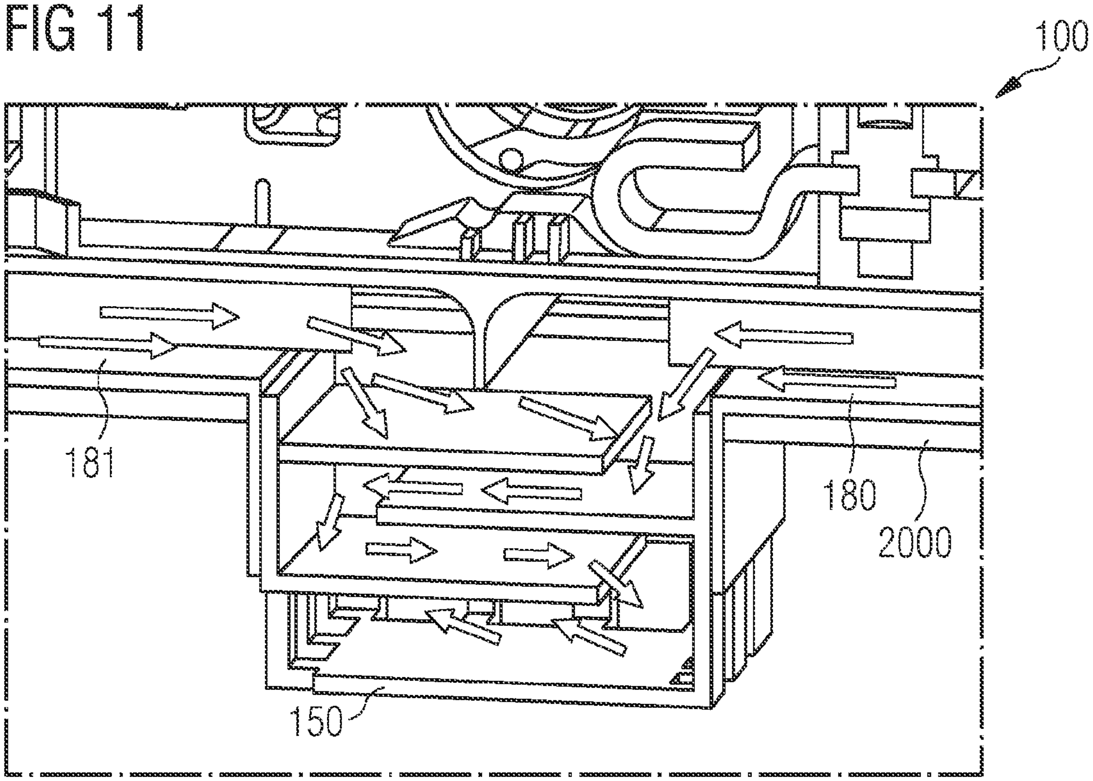
FIG. 11: shows a mounting adapter according to the invention with a filter box and a labyrinth.

In FIG. 11, the filter box 150 comprises a labyrinth. As a result, the exhaust gas flow of the switching gases covers a relatively long path within the filter box 150 and can condense on the surface of said labyrinth. Dirt particles or combustion particles can be precipitated on the wall of the labyrinth. The overall effect is therefore to prevent said dirt particles or combustion particles from exiting the mounting adapter 100.

The electrical switch 1000 can be introduced into the mounting adapter 100 according to the invention from the top side 110 thereof. This also applies to fastening and contact screws which are likewise accessible from the top side 110 of the mounting adapter 100.

The electrical switch 1000 can be, for example, a circuit breaker.

The mounting adapter 100 according to the invention can be securely mounted on a wall 2000 of a switch cabinet. This wall is likewise illustrated in the illustrations of the figures except for FIGS. 6A, 6B and 6C.

The mounting adapter 100 according to the invention permits the following properties:

- the switching gases from the electrical switch 1000 are trapped;
- the switching gases can be channeled in a phase-separated way in the mounting adapter 100;
- the switching gases are dissipated via the side/underside 120 of the mounting adapter 100;
- the switching gases are brought together on the side/underside 120 of the mounting adapter 100; and
- the mounting adapter 100 permits secure fastening of the electrical switch 1000.

It is important that the mounting adapter 100 withstands the turning-off pressure and that little gas due to leakages of the exhaust gas channels 170, 171, 172; 180, 181 passes to the outside or to the neighboring pole so as to avoid phase flashovers or housing flashovers.

The mounting adapter 100 therefore enables the exhaust gas flow of the switching gases to be guided and controlled in a defined way in the event of a short-circuit of the electrical switch 1000. It permits a particularly compact design, especially for fitting on the wall 2000 of a switch cabinet.

On the rear side of the electrical switch 1000 or on the side/underside 120 of the mounting adapter 100, the mounting adapter 100 enables the switching gases emerging there to be filtered such that said switching gases pass without soot and contact combustion particles, for example, into the switch cabinet. For this purpose, the switching gases are conducted through a filter box 150 in which there is, for example, a filter medium, such as glass wool or rockwool.

An advantage in this case is that, after a short-circuit of the electrical switch 1000 located in the switch cabinet, the soot and contact combustion particles are filtered out of the switching gases and, as a result, the switch cabinet is not soiled and does not have to be cleaned. The solution according to the invention with the filter box 150 enables a high percentage, for example >90%, of the switching gases to be cleaned.

The invention claimed is:

1. A mounting adapter configured to be securely mounted in a switch cabinet and configured to accommodate at least one electrical switch having an output side, an input side and outlets for switching gases on at least one of the output side or the input side, the mounting adapter comprising:

an underside of the mounting adapter; and exhaust gas channels of the mounting adapter for guiding switching gases of the electrical switch mounted in the mounting adapter from at least one of the output side or the input side to said underside for exiting the mounting adapter from said side or underside;

said exhaust gas channels including first exhaust gas channel sections and second exhaust gas channel sections;

said first exhaust gas channel sections being configured to initially guide the switching gases from at least one of the output side or the input side of the at least one electrical switch substantially perpendicularly toward said underside of the mounting adapter; and said second exhaust gas channel sections being configured to then direct the switching gases toward one another below the at least one electrical switch.

2. The mounting adapter according to claim 1, which further comprises a top side of the mounting adapter configured to permit mounting of the at least one electrical switch from the top side.

3. The mounting adapter according to claim 1, which further comprises electrically insulated fittings running through one of said first exhaust gas channel sections for conducting the switching gases past said electrically insulated fittings.

4. The mounting adapter according to claim 1, wherein said side or underside receives the switching gases guided separately downstream of respective poles of a multi-pole electrical switch provided as the at least one electrical switch.

5. The mounting adapter according to claim 1, wherein said second exhaust gas channel sections guide the switching gases at least partially separately downstream of respective poles of a multi-pole electrical switch provided as the at least one electrical switch.

6. The mounting adapter according to claim 1, which further comprises a filter box disposed on said side or underside for guiding the switching gases through said filter box to exit the mounting adapter.

7. The mounting adapter according to claim 1, which further comprises a filter box disposed on said side or underside, at a convergence of said second exhaust gas channel sections, for guiding the switching gases through said filter box to exit the mounting adapter.

8. The mounting adapter according to claim 6, wherein said filter box has:

a configuration of holes, or a filter medium filing said filter box, or a labyrinth.

9. The mounting adapter according to claim 7, wherein said filter box has:

a configuration of holes, or a filter medium filing said filter box, or a labyrinth.

10. The mounting adapter according to claim 1, which further comprises:

a top side of the mounting adapter, said top side being at least one of:

configured to permit introduction of the at least one electrical switch from said top side or having fastening and contact screws accessible from said top side.

11. The mounting adapter according to claim 1, wherein the mounting adapter is configured to accommodate a circuit breaker as the at least one electrical switch.

12. A switch cabinet, comprising:

said mounting adapter according to claim 1; and a wall;

said mounting adapter being securely mounted at said wall in the switch cabinet.

* * * * *